United States Patent [19]

Parrillo

[11] Patent Number: 4,769,747
[45] Date of Patent: Sep. 6, 1988

[54] ILLUMINATED PAPER CUTTER

[75] Inventor: Louis C. Parrillo, Austin, Tex.

[73] Assignee: Applied Ingenuity, Inc., Austin, Tex.

[21] Appl. No.: 36,758

[22] Filed: Apr. 8, 1987

[51] Int. Cl.⁴ ............................................. F21V 33/00
[52] U.S. Cl. ...................................... 362/89; 83/520; 362/97
[58] Field of Search ............... 362/31, 89, 97; 83/520

[56] References Cited

U.S. PATENT DOCUMENTS

| | | | |
|---|---|---|---|
| 1,267,055 | 5/1918 | Cathcart | 362/89 |
| 1,622,053 | 3/1927 | Rounds | 83/520 X |
| 2,378,249 | 6/1945 | Ruth | 362/89 |
| 2,444,723 | 7/1948 | Bowen | 362/89 |
| 2,461,532 | 2/1949 | Dixon | 362/31 |
| 3,356,839 | 12/1967 | Mehess et al. | 362/97 X |
| 3,410,994 | 11/1968 | Facto | 362/89 |

FOREIGN PATENT DOCUMENTS 1187223  2/1965  Fed. Rep. of Germany ........ 83/520

Primary Examiner—Tony M. Argenbright
Attorney, Agent, or Firm—Arnold, White & Durkee

[57] ABSTRACT

An illuminated paper cutter comprising an opaque cutting board having a cutting edge at one side, a cutting blade pivotally attached to the cutting board to coact with the cutting edge to cut material placed between the cutting blade and the cutting edge, and an illuminator attached to the cutting board to illuminate the cutting edge from below, the illuminator being located so as to not extend beyond the outside edge of the cutting edge.

19 Claims, 1 Drawing Sheet

ILLUMINATED PAPER CUTTER

BACKGROUND OF THE INVENTION

The present invention concerns a paper cutter provided with an illumination device to illuminate the cutting edge of the paper cutter. A complex illuminated photograph trimmer with reflective surfaces and a transparent cutting table is described in U.S. Pat. No. 1,267,055. U.S. Pat. No. 3,410,994 describes a paper cutter board illuminator for use with a cutting-wheel type paper cutter.

An object of this invention is to provide an illuminated paper cutter with an opaque cutting board, the light source being located to illuminate the cutting edge of the paper cutter from below.

Another object of this invention is to provide a paper cutter illumination attachment device that can be easily attached to a commercially available paper cutter.

Another object of this invention is to provide an illuminated paper cutter in which the light source illuminates the cutting edge of an opaque cutting board to render translucent that portion of the material on the cutting board that is to be cut off.

Another object of this invention is to provide an illuminated paper cutter in which the illumination device is located so that material cut on the cutting board does not fall onto the light source to block the light.

Another object of this invention is to provide a portable illuminated paper cutter having a power source comprising a battery or an electric socket connection.

Another object of this invention is to provide an illuminated paper cutter in which the paper cutter has an automatic switch which activates the illuminator when the cutting blade is raised.

From the following description, other objects and uses of this invention will be apparent to one skilled in the art.

SUMMARY OF THE INVENTION

An illuminated paper cutter is provided, comprising an opaque cutting board having a cutting edge at one side, a cutting blade pivotally attached to one side of the cutting board and an illuminator attached to the cutting board below the cutting edge. The illuminator is located so as to illuminate the cutting edge from below. By illuminating the cutting edge from below, the portion of the material placed on the cutting board that is to be cut off is rendered translucent. The cutting blade is attached to the cutting board so that by pivoting the blade downward, it coacts with the cutting edge to cut material placed between the cutting blade and the cutting edge. The illumination means may include one or more light bulbs and a power source, which may be a battery. The cutting edge includes an outside edge, and the illuminator is located so as to not extend beyond the outside edge of the cutting edge.

DESCRIPTION OF THE PREFERRED EMBODIMENT OF THE PRESENT INVENTION

Figure 1:
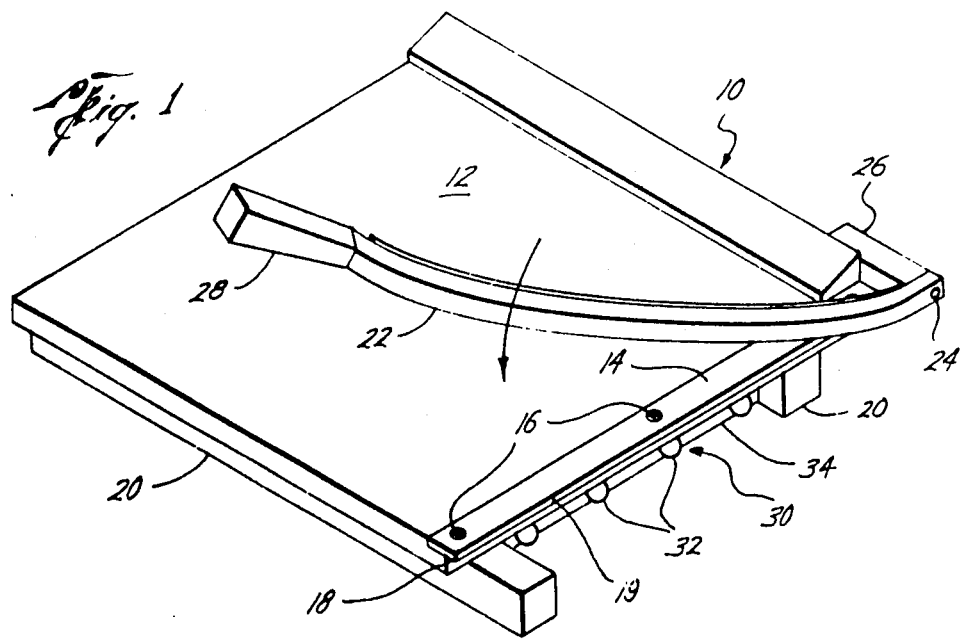
FIG. 1 is a perspective view of the illuminated paper cutter of the present invention.

Referring to the drawings in general and to FIG. 1 in particular, shown therein and designated by the general reference numeral 10 is an illuminated paper cutter constructed in accordance with the present invention. The paper cutter 10 includes an opaque cutting board 12. The cutting board may include vertical and horizontal reference lines inscribed thereon (not shown). A cutting edge 14 is located at one side of the cutting board 12. The cutting edge 14 is attached to the cutting board 12 by means of screws 16 or other fasteners. The cutting edge 14 is attached to the cutting board 12 so that there is a slight overhang 18 of the cutting edge 14 over the cutting board 12. The side of the cutting edge 14 that defines the limit of the overhang 18 forms the outside edge 19 of the cutting edge 14. The cutting edge 14 is generally a hard metal material, such as steel. Supports 20 are attached to the bottom of the cutting board 12 to elevate the cutting board 12 from a horizontal support surface (not shown) on which the paper cutter 10 may be resting.

A cutting blade 22 is attached to the cutting board 12 at the same side of the cutting board 12 as the cutting edge 14. The cutting blade 22 is attached to the cutting board 12 by means of a pivot 24. The pivot 24 is connected to a pivot housing 26. The pivot housing 26 is attached to the cutting board 12. The cutting blade 22 is attached to the pivot 24 by means of a bolt (not shown). A torsion spring (not shown) may be attached to the pivot 24 within the pivot housing 26 to facilitate the cutting of paper or other material. A blade handle 28 is attached to the cutting blade 22 at the end opposite the pivot 24.

A downward force applied to the blade handle 28 pivots the cutting blade 22 about the pivot 24 in a downward direction, as indicated by the arrow in FIG. 1. The cutting blade 22 is attached to the cutting board 12 so that when the cutting blade 22 is pivoted downward, the cutting blade 22 coacts with the cutting edge 14 to cut material placed between the cutting blade 22 and the cutting edge 14.

An illuminator, indicated in FIG. 1 by the general reference numeral 30, is located below the cutting board 12. The illuminator 30 includes a plurality of light bulbs 32. In another embodiment of this invention, the illuminator 30 may include a single bulb, such as a fluorescent bulb (not shown). The light bulbs 32 are located on a bulb support 34. The bulb support 34 is attached to the bottom of the cutting board 12. In one embodiment of this invention, the bulb support 34 may be attached to the cutting board 12 by means of an adhesive strip located between the cutting board 12 and the bulb support 34. In another embodiment of this invention, the bulb support 34 is fastened to the cutting board with screws. The cutting board 12 may include a means for attaching the illuminator, such as brackets (not shown).

As seen in FIG. 1, the illuminator 30 is attached to the cutting board 12 between the supports 20. Because the supports 20 elevate the cutting board 12 above a horizontal support surface, the illuminator 30 is located below the bottom surface of the cutting board 12 and above the horizontal support surface.

Figure 2:
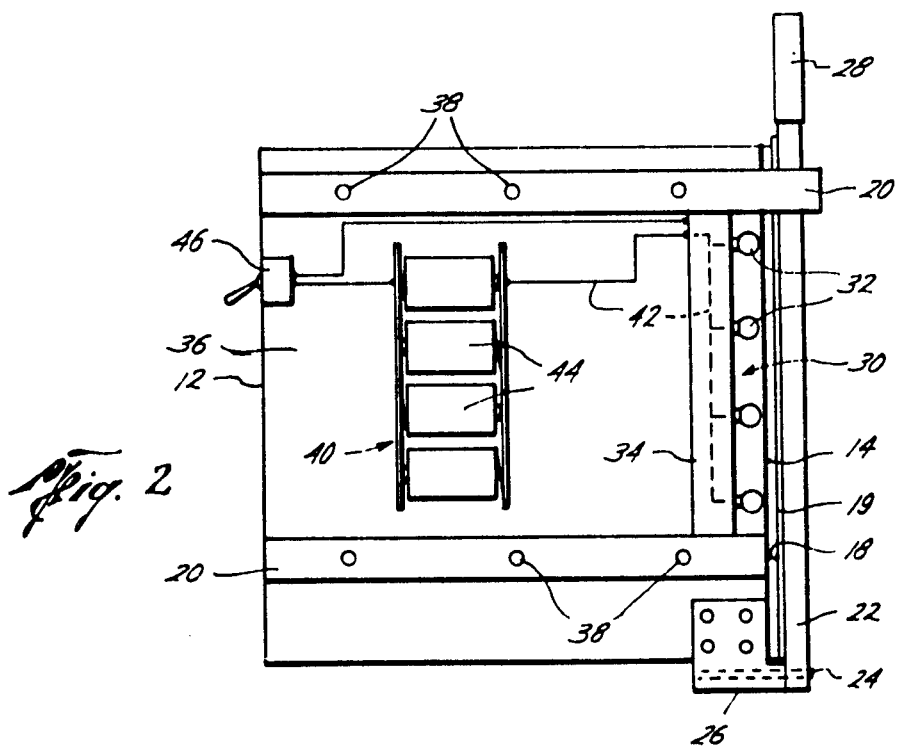
FIG. 2 is an upward plan view of the illuminated paper cutter showing in greater detail the illuminator.

The illuminator 30 may be seen more clearly in reference to FIG. 2. The illuminator in FIG. 2 is indicated generally by general reference numeral 30. FIG. 2 shows the bottom 36 of the cutting board 12. Supports 20 are connected to the bottom 36 of the cutting board 12 by means of screws 38 or other fasteners. At one side of the cutting board 12 there is a slight overhang 18 of the cutting edge 14. The outside edge 19 defines the limit of the overhang 18 of the cutting edge 14. The cutting blade 22 is attached to the cutting board 12 adjacent the cutting edge 14 by means of a pivot 24.

In the embodiment shown, the illuminator 30 includes a plurality of light bulbs 32 connected to a bulb support 34. The bulb support 34 is attached to the bottom 36 of the cutting board 12 by an adhesive strip between the bulb support 34 and the cutting board 12. The light bulbs 32 are located below the bottom 36 of the cutting board 12 so as to not extend past the outside edge 19 of the cutting edge 14. In this manner, cuttings from the material cut by the paper cutter will not fall on the light bulbs so as to obstruct the light.

The illuminator 30 includes a power source 40 connected to the light bulbs 32 by means of wire connections 42. In the embodiment shown, the power source 40 is a series of batteries 44. In another embodiment of this invention (not shown), the power source may be an electric socket connection comprising an electric wire with a plug at one end adapted to be inserted into an electric socket. The power source may include a transformer (not shown) for connection to a fluorescent bulb. The illuminator 30 may include a control switch 46 connected in series with the power source 40 and the light bulbs 32. The control switch 46 may be an on/off power switch or a rheostat to control the intensity of the light. In another embodiment (not shown) the control switch may be an automatic control switch, which automatically activates the illuminator when the cutting blade is moved. In this embodiment, the electrical circuit is open when the cutting blade is in the full downward position. When the cutting blade is raised, the electrical circuit is closed and the illuminator is activated. The automatic control switch may be a mechanical or a magnetic switch which connects the power source to the light bulbs when the cutting blade is raised.

The illuminator 30 may include a timer (not shown) for deactivating the illuminator after a period of nonuse to prevent excessive power usage. The timer comprises an on/off switch and an electronic timing circuit connected to the cutting blade. When the illuminator is activated and the cutting blade is moved, the timing circuit is activated. After a predetermined period of time during which the cutting blade is not moved, the timing circuit deactivates the switch, turning off the illuminator.

In operation, when the illuminator 30 is activated, the light bulbs 32 are lit, illuminating the cutting edge 14 from below. Materials placed on the opaque cutting board 12 likewise will be illuminated only to the extent that they extend beyond the cutting edge 14. In this way, the portion of the material to be cut off will be rendered translucent.

Changes may be made in the construction, operation, or arrangement of the various parts, elements, steps, or procedures described herein without departing from the concept and scope of the invention as defined in the following claims.

What is claimed is:

1. A paper cutter comprising:
   an opaque cutting board having sides, a top and a bottom;
   a cutting edge attached to a first side of the cutting board, the cutting edge having an outside edge;
   a cutting blade pivotally attached to a side of the cutting board and being adapted to be pivoted downward so that the cutting blade coacts with the cutting edge to cut materials placed between the cutting blade and the cutting edge; and
   an illuminator attached to the bottom of the cutting board and positioned to illuminate the cutting edge from below, the illuminator being located so as to not extend beyond the outside edge of the cutting edge so that materials cut by the paper cutter do not fall on the illuminator.

2. The paper cutter of claim 1 wherein the illuminator is defined further as comprising a light source and a power source connected to the light source.

3. The paper cutter of claim 1 wherein the illuminator is defined further as comprising a control switch.

4. The paper cutter of claim 3 wherein the control switch is further defined as being an automatic control switch.

5. The paper cutter of claim 1 wherein the illuminator is further defined as comprising a timer for automatically deactivating the illuminator after a period of time during which the paper cutter is not used.

6. The paper cutter of claim 2 wherein the light source is further defined as being a light bulb.

7. The paper cutter of claim 6 wherein the light bulb includes an elongated body positioned longitudinally parallel to and proximate the outside edge of the cutting edge.

8. The paper cutter of claim 2 wherein the light source is further defined as being a plurality of light bulbs.

9. The paper cutter of claim 8 wherein the light bulbs are arranged in a spaced relationship along a line parallel to and proximate the outside edge of the cutting edge.

10. The paper cutter of claim 2 wherein the power source is further defined as being a battery.

11. The paper cutter of claim 2 wherein the power source is further defined as being an electric socket connection, the electric socket connection comprising:
    an electric wire having a free end, and having an attached end connected to the light source; and
    an electric plug connected to the free end of the electric wire, the electric plug being adapted to be inserted into an electric socket.

12. The paper cutter of claim 1 wherein the illuminator is further defined as comprising:
    a bulb support;
    at least one light bulb attached to the bulb support; and
    a power source connected to the at least one light bulb;
    the bulb support being removably attached to the bottom of the cutting board.

13. The paper cutter of claim 12 wherein the bulb support is further defined as being adapted to be attached to the cutting board by at least one screw.

14. The paper cutter of claim 12 wherein the bulb support is further defined as being adapted to be attached to the cutting board by an adhesive strip.

15. The paper cutter of claim 12 wherein the power source is removably attached to the cutting board.

16. The paper cutter of claim 1 wherein the cutting board is further defined as having supports attached to the bottom of the cutting board to elevate the cutting board from a horizontal support surface, the illumination means being attached to the bottom of the cutting board in a space between the cutting board and a horizontal support surface when the paper cutter is resting on a horizontal support surface.

17. The paper cutter of claim 1 wherein the bottom of the opaque cutting board is furtther defined as comprising means for attaching an illuminator.

18. An illumination attachment device comprising:
a light source adapted to be attached beneath an opaque paper cutter cutting board having a cutting edge, the cutting edge having an outside edge;
a power source connected to the light source;
the light source being adapted to be attached to the cutting board so that the cutting edge may be illuminated from beneath the cutting board when the ight source is activated, and so that the light source does not extend beyond the outside edge of the cutting edge.

19. The device of claim 18 wherein the illumination attachment is further defined as comprising a control switch.

* * * * *